UNITED STATES PATENT OFFICE.

WILLIAM LAMARTINE BREYFOGLE, OF LAKE GEORGE, NEW YORK, ASSIGNOR TO CALIFORNIA PHARMACY COMPANY, OF SAN FRANCISCO, CALIFORNIA, A CORPORATION OF CALIFORNIA.

BEET-ROOT CRACKER OR FOOD.

1,161,450.          Specification of Letters Patent.      Patented Nov. 23, 1915.

No Drawing.      Application filed October 30, 1912.    Serial No. 728,736.

*To all whom it may concern:*

Be it known that I, WILLIAM LAMARTINE BREYFOGLE, a citizen of the United States, residing at Lake George, in the county of Warren and State of New York, have invented a new and useful Beet-Root Cracker or Food, of which the following is a specification.

This invention relates to an article of manufacture already known commercially in the markets, though for a few months only, as "Vegatol," a name which has already been registered as a trade-mark in the State of California, and for which registration has been applied for in the Patent Office of the United States, having new and characteristic properties as a food and as a laxative, without gripe, and is composed of a vegetable fiber which acts mechanically on the sluggish intestinal tract of the human system, combined with an organic laxative, adapted both to support life and to work a rational, safe and scientific treatment of constipation, for cure and for prevention; and this invention also relates to the process of making the same.

The modern tendency toward purity of food and highly concentrated food results in an insufficiency of fecal matter in the large intestine, which is at the same time too hard and dry for the power of the intestine to move it onward to its discharge, and the result is a prolonged stay in the larger intestine of the fecal matter, down to the point of putrefaction, followed by constipation, with all its attendant evils.

I make use of the scientific fact that the residue from digested food must be of larger quantity than is obtained from highly-concentrated foods, and that this larger quantity is necessary to the normal action of the intestine, and that freedom from constipation may be had by the occasional use of foods of high hygroscopic power, commingled with a harmless organic laxative.

The objects of my invention are: 1st. To provide a laxative cracker of agreeable taste, which from its hygroscopic nature will increase in volume, without irritation to the intestine, and which will furnish by its increased volume a sufficient amount of fecal matter for the normal working of the intestine. 2nd. To provide constituents which will prevent the fecal matter from becoming hard or dry. 3rd. To provide a small amount of organic laxative, which will still further increase the natural movement of the intestines.

Other objects will appear from the hereinafter description.

I will now describe the process of making my improved beet-root cracker, from which may be inferred the nature and constituents of the cracker itself, omitting the method of mixing the materials, rolling and cutting the substance for baking, and the baking itself,—steps which are well-known to those skilled in any branch of bakery. The constituents are as follows: I take exhausted sugar beet pulp, preferably after the sugars have been exhausted, by any suitable process, such as slicing the beets, then treating them by diffusion to extract the sugar, then forcing them through a filter press to exhaust all the sugar carrying water that is possible, or I may employ any other process for treating the beets to extract the sugar; and whatever the extraction process may be, up to this point I then dry the exhaust residue or pulp and grind the same. I have then a meal, and of this I take for one hundred pounds of cracker material, fifteen pounds of the dried beet-root meal. To this I add half a pound of phenolphthalein. To this I add sixty pounds of flour, preferably wheat flour, ten pounds of lard, thirteen pounds of honey, one pound of salt, and half a pound of bicarbonate of soda. These having been made into a dough, the crackers are made and baked, in the manner well known to those interested in the art.

Beet-root is highly hygroscopic, and by its absorption of water has the greatest expansion of any substance available for food. It absorbs moisture from the intestine and retains the absorbed water, passing through the intestinal canal practically unchanged, but by its bulk it stimulates the sluggish bowel, helping it to its normal contractions and reëstablishing its tone; and phenolphthalein is preferably the organic laxative employed, which still further increases the natural movement of the intestine. I thus realize all the foregoing objects.

I do not confine myself to the proportions stated; and especially the proportions of wheat flour, lard, salt, honey, and bicarbonate of soda may be varied according to the practice of any baker. I do not confine myself to the particular laxative, phenolphthalein, for other laxatives may be substituted, and the objects of my invention may thus be in part and imperfectly realized, but the foregoing materials and proportions are preferred.

The beet-root and the phenolphthalein, as constituents of a laxative cracker, constitute a substantive and striking advance over the prior art, such that the cracker may be taken before or at meals, or before bedtime, for a few times, and thus cure chronic constipation, or it may be eaten only a few times and occasionally for its prevention.

I use the word cracker in its broadest sense, intending thereby to cover any commercial form of this food, whether baked or canned.

Having now described my invention, what I claim as new and desire to secure by Letters Patent is—

1. A laxative cracker containing meal made from exhausted sugar beet pulp and a laxative.

2. A laxative cracker containing meal made from exhausted sugar beet pulp, wheat flour, lard, honey, salt, bicarbonate of soda and phenolphthalein.

3. A laxative cracker containing meal made from exhausted sugar beet pulp.

4. A laxative cracker containing meal made from beet root.

5. A laxative cracker containing beet-root meal.

In witness whereof, I have hereunto set my hand, at the city, county and State of New York, this 29th day of October, 1912.

WILLIAM LAMARTINE BREYFOGLE.

In presence of—
ISABEL R. RICHARDS,
JOHN J. RANAGAN.